Jan. 29, 1935. DE WITT EZELL 1,989,407
FISH SNATCHER
Filed April 20, 1934 3 Sheets-Sheet 3
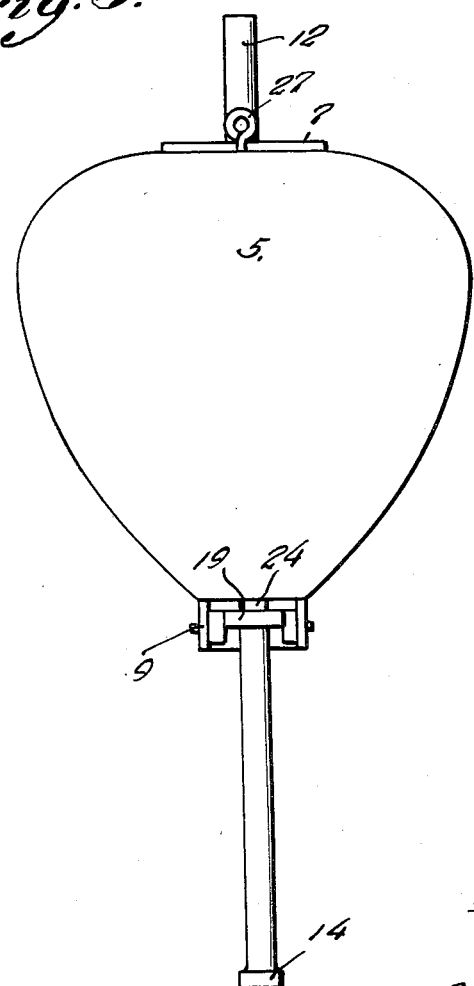
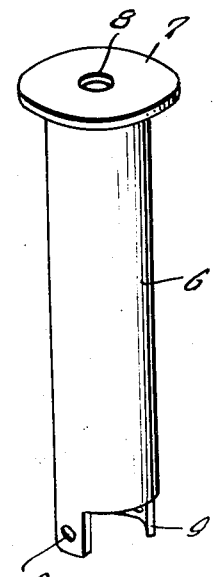
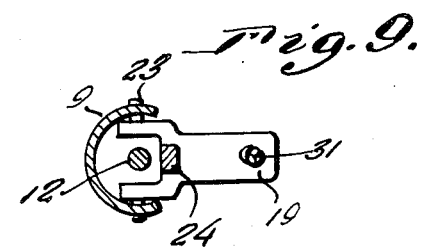
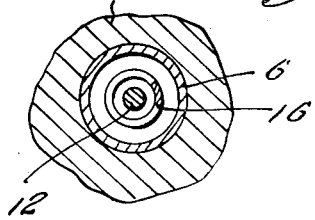
Inventor
De Witt Ezell
By Clarence A. O'Brien
Attorney

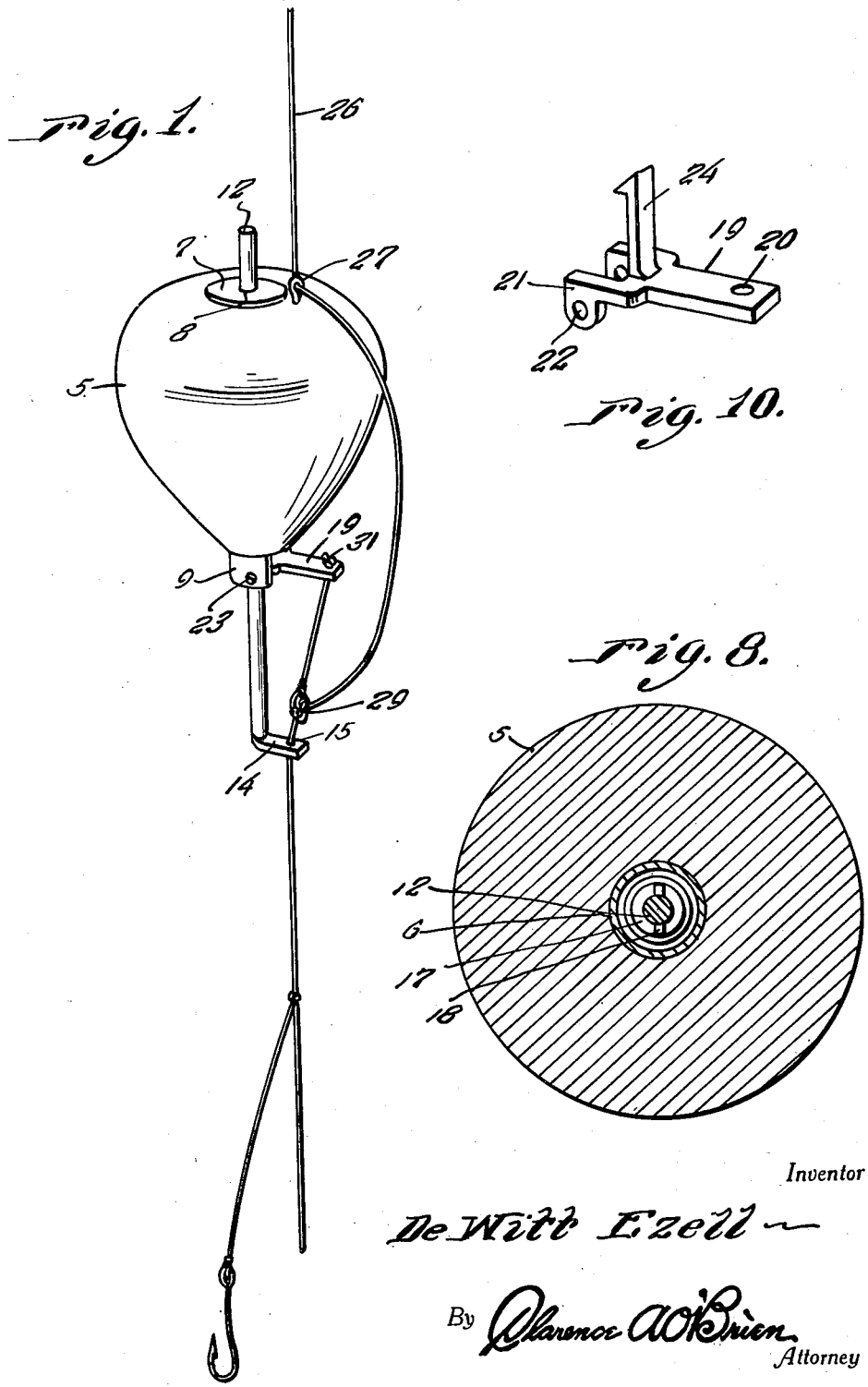

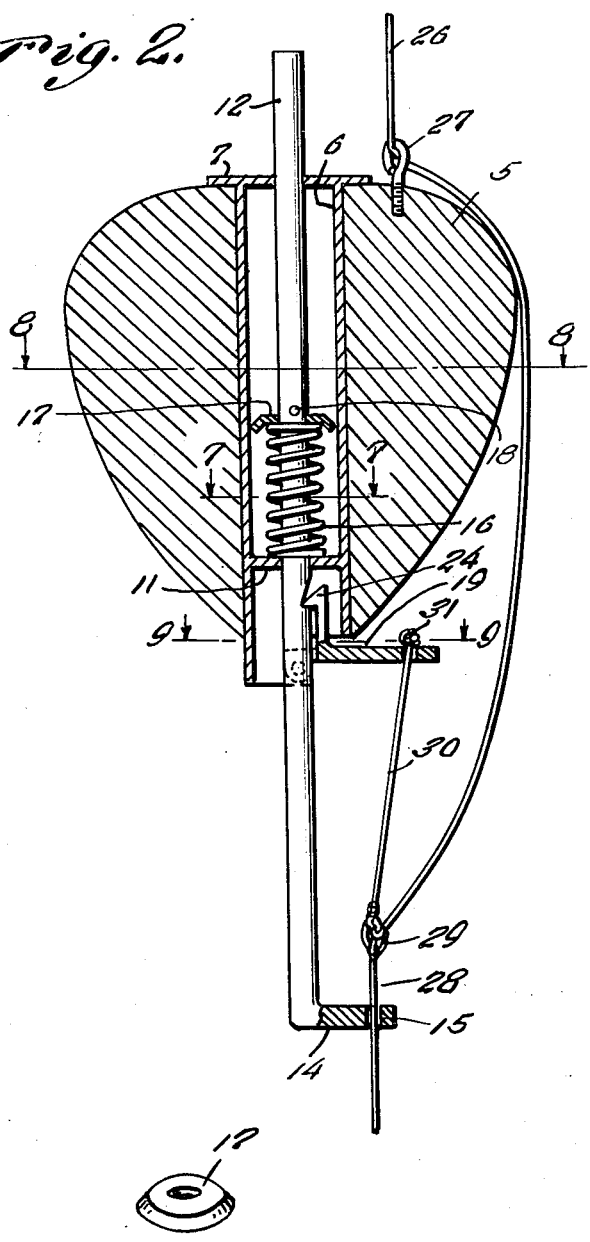
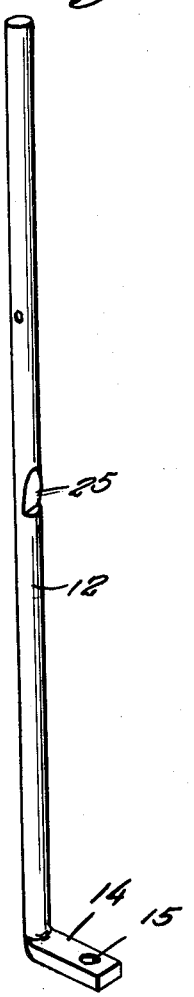

UNITED STATES PATENT OFFICE 1,989,407

FISH SNATCHER

De Witt Ezell, Nashville, Tenn.

Application April 20, 1934, Serial No. 721,606

2 Claims. (Cl. 43—15)

The present invention relates to a fish snatcher and has for its prime object to provide means for jerking on the fishing line when a fish bites without the necessity of the fisherman jerking the line as is usually the practice.

Another important object of the invention resides in the provision of a device of this nature which is simple in its construction, inexpensive to manufacture, thoroughly efficient and reliable in use and operation, convenient, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a perspective view of the device embodying the features of my invention.

Figure 2 is a vertical section therethrough.

Figure 3 is a side elevation of the device embodying the features of my invention.

Figure 4 is a perspective view of the rod.

Figure 5 is a perspective view of the casing.

Figure 6 is a perspective view of a disk.

Figure 7 is a detail sectional view taken substantially on the line 7—7 of Figure 2.

Figure 8 is a horizontal section taken substantially on the line 8—8 of Figure 2.

Figure 9 is a detail section taken substantially on the line 9—9 of Figure 2, and Figure 10 is a perspective view of the catch.

Referring to the drawings in detail it will be seen that the numeral 5 denotes a float or cork having a central bore or opening in which is located a casing 6 in the form of a sleeve having a disk 7 at one end extending beyond the outer surface of the sleeve to form a shoulder resting on the upper surface of the float and provided with a central opening 8. The bottom end of the sleeve-like casing 6 protrudes through the bottom end of the float 5 and the protruding portion has one side cut away to provide an opening 9 and the portion with the opening 9 is provided with a pair of opposed holes 10. A partition 11 extends across the lower portion of the sleeve-like casing 6 and has a central opening through which is slidable a rod 12. This rod 12 is also slidable through the opening 8. The lower end of the rod 12 has a right angularly disposed extension 14 with an opening 15. A coil spring 16 is disposed about the rod 12 and impinges against the partition 11 and against a disk 17 disposed about the rod in abutment with a pin 18 extending through the rod and this spring normally holds the rod in a raised position. A catch comprises a lever 19 with an opening 20 at one end portion and a pair of spaced parallel coextensive ears 21 at the other end provided with openings 22 in which are fixed lugs or trunnions 23 journalled in the openings 10. Rising from the lever 19 adjacent the ears 21 is a catch element 24 engageable with a notch 25 to hold the spring 16 under tension.

A fishing line section 26 is trained through an eye 27 on the top of the float 5 and is secured to a line section 28 as at 29 below the catch and above the extension 14. An extension 30 of the section 28 is disposed through the opening 15 and knotted as at 31. With the parts in set position as shown in Figure 2 and also in Figure 1 it will be seen that if a fish bites at the bait and slightly jerks on the line section 28 the catch will be rocked to free the catch element 24 from the notch 25 so that the spring 16 will move the rod 12 quickly upwardly so that its extension 14 engages the connection 29 thereby pulling upwardly on the section 28.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described including, in combination, a float, a fishing line, and a mechanism incorporated in the float for jerking on the fishing line when the fishing line is pulled downwardly by a fish, said mechanism being in the form of a sleeve-like casing through the float having an intermediate partition with an opening and a disk with an opening, a rod slidable through the casing and the openings and having an angular extension on its lower end provided with an opening and a notch intermediate its ends, a fishing line extending through the opening, a catch rockably mounted on the lower end of the casing and having an element engageable with the notch in the rod, an extension engaged with the catch, a connection between the extension and the fishing line, and spring means associated with the rod normally holding the same upwardly.

2. A device of the class described comprising a float having an opening therethrough, a casing in the opening, a rod slidable through the casing and having a notch, spring means associated with the rod normally holding the same upwardly, an extension on the lower end of the rod, a catch rockable in the lower portion of the casing and having an element engageable with the notch in the rod, for holding the rod with the spring under tension, a fishing line section trained through an eye on the upper portion of the float and terminating below the catch, a second section, a connection between the sections, a third section engaged with the connection and extending through an opening in the catch and being knotted.

DE WITT EZELL.